(12) United States Patent
Hoch et al.

(10) Patent No.: US 11,827,138 B1
(45) Date of Patent: Nov. 28, 2023

(54) ADJUSTABLE FASTENER

(71) Applicant: HOCH BRANDS LLC, Boca Raton, FL (US)

(72) Inventors: Bruce A Hoch, Durango, CO (US); Charles V. Hoch, Durango, CO (US)

(73) Assignee: Hoch Brands LLC, Boca Raton, FL (US)

( * ) Notice: Subject to any disclaimer, the term of this patent is extended or adjusted under 35 U.S.C. 154(b) by 0 days.

(21) Appl. No.: 17/860,622

(22) Filed: Jul. 8, 2022

(51) Int. Cl.
*B60P 7/08* (2006.01)

(52) U.S. Cl.
CPC .................. *B60P 7/0823* (2013.01)

(58) Field of Classification Search
CPC ............. Y10T 24/2192; Y10T 24/4773; Y10T 24/4755; Y10T 24/4745; B60P 7/0823; A44B 11/125
See application file for complete search history.

(56) References Cited

U.S. PATENT DOCUMENTS

| | | | | |
|---|---|---|---|---|
| 1,393,425 | A * | 10/1921 | Buchsbaum | A44B 11/12 24/170 |
| 5,661,877 | A * | 9/1997 | Bloomer | A44B 11/12 24/309 |
| 5,842,256 | A * | 12/1998 | Anscher | A45F 5/00 24/600.9 |
| 6,161,266 | A * | 12/2000 | Anscher | A45F 5/02 24/615 |
| 6,725,506 | B1 * | 4/2004 | Anscher | A45F 5/00 24/3.1 |
| 8,387,217 | B1 * | 3/2013 | Hinds | A63B 21/00065 24/265 H |
| 8,935,833 | B2 * | 1/2015 | Kaneko | A44B 11/065 24/191 |

OTHER PUBLICATIONS

"120cm Men's Elastic Stretch Nylon Belt with Plastic Buckle for Jeans," obtained May 23, 2023 from <https://www.ebay.com/itm/224171933090>.
"2 inch Adjustable Belt Elastic Cord with Steel Core Hooks," Boxer Tools, obtained May 23, 2023 from <https://www.boxertool.com/products/2-inch-adjustable-belt-elastic-cord-with-steel-core-hooks?variant=15691354669165>.
"3/8" Flat Purple Adjustable Breakaway Lanyard w/"No. Twist" Wide Plastic Hook," obtained May 23, 2023 from <https://www.google.com/imgres . . . >.
"3/8" Flat Purple Adjustable Breakaway Lanyard w/"No-Twist" Wide Plastic Hook," obtained May 23, 2023 from <https://www.identiphoto.com/3-8-flat-purple-adjustable-breakaway-lanyard-w-no-twist-wide-plastic-hook.html>.
"8PCS 80 Inches Adjustable Bungee Cords with Hooks Flat Rubber Bungee Cords Heavy," obtained May 23, 2023 from <https://www.ebay.com/itm/394425240793>.

(Continued)

*Primary Examiner* — Robert Sandy
(74) *Attorney, Agent, or Firm* — Dorsey & Whitney LLP

(57) ABSTRACT

In one embodiment a clasp assembly includes a main body with a receptacle formed in therein and adapted to receive a flexible element and a bail rotatably coupled to the main body. The bail includes a cam portion configured to engage the flexible element in a first rotational configuration, a lock assembly configured to releasably engage the main body to secure the cam portion in the first rotational configuration.

14 Claims, 13 Drawing Sheets

(56) References Cited

OTHER PUBLICATIONS

"8PCS 80 Inches Adjustable Bungee Cords with Hooks Flat Rubber Bungee Cords Heavy," Youngthye, obtained May 23, 2023 from <https://www.google.com/imgres . . . >.
"Adjustable 6' Flat Bungee Straps," National RV Covers, obtained May 23, 2023 from <https://www.google.com/imgres . . . >.
"Adjustable Bungee Cords—A Safer option to Regular Bungees?—WRAPTIE," obtained May 23, 2023 from <https://www.google.com/imgres . . . >.
"Adjustable Bungee Cords—A safer option to regular bungees?" WRAPTIE, obtained May 23, 2023 from <https://wraptie.net/blogs/news/adjustable-bungee-cords>.
"Adjustable Bungee," Lee Valley Tools, obtained May 23, 2023 from <https://www.leevalley.com/en-ca/shop/home/storage/ropes-bungees-and-tie-downs/70083-adjustable-bungee?item=68K0665>.
"APCC EZ Install Adjustable Bungee Cord Hook, 10/Pack," APCC, obtained May 23, 2023 from <https://www.amazon.com/APCC-Install-Adjustable-Bungee-Cord/dp/B00G5PU126?source=ps-sl-shoppingads-lpcontext&ref_=fplfs&psc=1&smid=A3DMYIN9K0RYXC>.
"CRESSI," photo obtained May 23, 2023 from <https://m.media-amazon.com/images/W/IMAGERENDERING_521856-T1/images/I/81J1qDa+G-L._AC_UF1000,1000_QL80_.jpg>.
"LionVII Elastic Belts for Men, STretch Canvas No Metal Plastic Buckle for Work Travel Sports Trim to Fit 27-46"Waist," obtained May 23, 2023 from <https://www.amazon.com/Elastic-Stretch-Canvas-Plastic-Buckle/dp/B08HVS3DMH?th=1>.
"Mares Weight Belt—Plastic Buckle," Mares, obtained May 23, 2023 from <https://www.google.com/imgres . . . >.
"Mares Weight Belt—Plastic Buckle," Mares, obtained May 23, 2023 from <https://www.lucasdivestore.com/en/mares-weight-belt-plastic-buckle.html>.
"Multi-Configuration Adjustable Bungee Cords with Hooks," Mella, obtained May 23, 2023 from <https://www.amazon.com/Link-Latch-Interlocking-Adjustable-Transforming/dp/B08VHMMGNK?th=1>.
"Onegee Bungee: Elastic rope with adjustable length and dual hooks," Vat19, obtained May 23, 2023 from <https://www.google.com/imgres . . . >.
"Onegee Bungee: Elastic rope with adjustable length and dual hooks," Vat19, obtained May 23, 2023 from <https://www.vat19.com/item/onegee-bungee-adjustable-tiedown>.
"Products: Buckle," YKK Fastening Products Group, obtained May 23, 2023 from <https://www.ykkfastening.com/products/plastic_hardware/buckle/?pno_906=3>.
"RV Accessories: (2) Adjustable 6' Flat Bungee Straps," National RV Covers, obtained May 23, 2023 from <https://www.nationalrvcovers.com/2strap-kit.html>.
"SCD diving belt with plastic buckle—Decathlon," obtained May 23, 2023 from <https://www.google.com/imgres . . . .
"Scd diving belt with plastic buckle," Decathlon Malaysia, obtained May 23, 2023 from <https://www.decathlon.my/diving-weights/148371-56003-scd-diving-belt-with-plastic-buckle.html>.
"STAPLL HD Adjustable Bungee Cord Set (2-Pack)," Hoch Brands, LLC, obtained May 23, 2023 from <https://stapll.com/collections/featured-cargo-control-products/products/30-hd-adjustable-bungee-cord-set-2-pack>.

\* cited by examiner

ADJUSTABLE FASTENER

FIELD

This disclosure relates generally to systems providing for adjustable fasteners and related methods.

BACKGROUND

Strap fasteners are commonly used to secure loads or cargo to another vehicle or object. For example, ratchet straps, bungee cords, cinch straps, or the like may be used. However, known strap fasteners can be cumbersome to use or subject to coming unsecured from a load due to vehicle acceleration, vibration, turning, shifting of the load, etc. For example, ratchet straps are cumbersome because when loose, the strap lacks the stiffness to allow the ratchet to be operated with one hand. Bungee cords can easily come loose as the strap flexes while a load is in transit. Improved adjustable fasteners are desired which are easy to use and can secure a load with reduced risk of the load becoming unsecured.

BRIEF SUMMARY

In some embodiments, a clasp assembly includes a main body with a receptacle formed therein and adapted to receive a flexible element, and a bail rotatably coupled to the main body. The bail includes a cam portion configured to engage the flexible element in a first rotational configuration, and a lock assembly configured to releasably engage the main body to secure the cam portion in the first rotational configuration.

Optionally, in some embodiments, the main body defines a recess and the bail defines a protruding member. In the first rotational configuration the protruding member is received in the recess and configured to lock an elongated flexible element to the clasp; and in a second configuration of the bail the protruding member is disengaged from the recess and is configured to release an elongated flexible member.

Optionally, in some embodiments, the protruding member has a resilient property and deflects away from and into the recess as the bail is moved from the second configuration to the first configuration.

Optionally, in some embodiments, the recess is formed in a first side wall extending from the bail; and the protruding member includes a first tang extending from the main body, wherein the first side wall and the first tang are adapted to interlock with one another to secure the cam portion in the first rotational configuration.

Optionally, in some embodiments, the cam portion is configured to disengage the flexible element in a second rotational configuration.

Optionally, in some embodiments, the main body includes: an end wall; and opposing side walls two side walls offset from one another in a lateral direction on opposite portions of the end wall.

Optionally, in some embodiments, the main body further includes a bottom wall extending between the two side walls.

Optionally, in some embodiments, the receptacle is formed between the two opposing side walls, the end wall, and the bottom wall.

Optionally, in some embodiments, the clasp further includes an attachment structure extending from the end wall in a substantially longitudinal direction.

Optionally, in some embodiments, the clasp further includes an inner body received at least partially in the attachment structure and at least partially in the end wall.

Optionally, in some embodiments, the flexible element includes a tension portion and a tail portion.

Optionally, in some embodiments, a compartment is formed in the main body between the two opposing walls and the bottom wall.

Optionally, in some embodiments, the compartment is configured to receive at least part of the tail portion.

Optionally, in some embodiments, a recess is formed in the bottom wall and in communication with the compartment.

Optionally, in some embodiments, an engagement feature extends from the bottom wall into the recess.

Optionally, in some embodiments, the tail portion is disposed between the cam portion and the engagement feature when the cam portion is in the first rotational configuration.

Optionally, in some embodiments, the cam portion includes a plurality of teeth configured to engage the flexible element in the first rotational configuration.

Optionally, in some embodiments, the first side wall includes: a head portion, and a neck portion, where the neck portion has a dimension smaller than a dimension of the head portion. The first tang includes: a head portion, and a neck portion and the neck portion has a dimension smaller than a dimension of the head portion.

Optionally, in some embodiments, the head portion of the first side wall engages the neck portion of the first tang, and the head portion of the first tang engages the neck portion of the first side wall to secure the cam portion in the first rotational configuration.

Optionally, in some embodiments, at least one of the first side wall or the first tang has a resilient property.

Optionally, in some embodiments, the lock assembly further includes: a second side wall extending from the bail; and a second tang extending from the main body. The second side wall and the second tang are adapted to interlock with one another to secure the cam portion in the first rotational configuration.

Optionally, in some embodiments, the lock assembly further includes: a resilient portion of the bail that engages the main body to secure the cam portion in the first rotational configuration.

Optionally, in some embodiments, the resilient portion includes: a descending portion of the bail; a bottom portion of the bail; and an ascending portion of the bail.

Optionally, in some embodiments, the main body includes a pedestal, the pedestal including a first pawl, and the ascending portion includes a second pawl. The first pawl engages the second pawl to secure the cam portion in the first rotational configuration.

Optionally, in some embodiments, the lock assembly further includes: a second receptacle formed in the main body and a pawl formed in an edge portion of the bail. The pawl engages the second receptacle to secure the cam portion in the first rotational configuration.

Optionally, in some embodiments, the bail includes a clearance aperture formed between a top face of the bail and a bottom face of the bail and proximate to the pawl.

Optionally, in some embodiments, as the bail is moved between the first rotational configuration where the cam portion engages the flexible element and a second rotational configuration where the cam portion disengages the flexible element, the pawl at least partially displaces toward the clearance to enable movement of the bail between the first rotational configuration and the second rotational configuration.

In some embodiments an adjustable fastener includes: an elongated flexible element including a tension portion and a tail portion; a first attachment structure coupled to the tension portion; and a clasp assembly. The clasp assembly includes: a main body with a receptacle formed in therein and adapted to receive the tension portion; a second attachment structure coupled to the main body; and a bail rotatably coupled to the main body. The bail includes a cam portion configured to engage the flexible element in a first rotational configuration and configured to disengage the flexible element in a second rotational configuration.

Optionally, in some embodiments, the adjustable fastener includes a lock assembly configured to releasably engage the main body to secure the cam portion in the first rotational configuration.

Optionally, in some embodiments, the cam portion is configured to disengage the flexible element in a second rotational configuration.

Optionally, in some embodiments, the first attachment structure further includes an inner body.

Optionally, in some embodiments, the lock assembly includes: a first side wall extending from the bail; and a first tang extending from the main body, wherein the first side wall and the first tang are adapted to interlock with one another to secure the cam portion in the first rotational configuration.

Optionally, in some embodiments, the lock assembly includes: a resilient portion of the bail that engages the main body to secure the cam portion in the first rotational configuration.

Optionally, in some embodiments, the resilient portion includes: a descending portion of the bail; a bottom portion of the bail; and an ascending portion of the bail.

Optionally, in some embodiments, the lock assembly further includes a second receptacle formed in the main body and a pawl formed in an edge portion of the bail. The pawl engages the second receptacle to secure the cam portion in the first rotational configuration.

In some embodiments, an adjustable fastener includes: an elongated flexible element including a tension portion and a tail portion; a first attachment structure coupled to the tension portion; and a clasp assembly. The clasp assembly includes a main body with a receptacle formed in therein and adapted to receive the tension portion; a second attachment structure coupled to the main body; and a bail rotatably coupled to the main body. The bail includes a lock assembly configured to releasably engage the main body to secure the bail in a first rotational configuration.

Optionally, in some embodiments, the adjustable fastener further includes a cam portion configured to engage the flexible element in a first rotational configuration, and configured to disengage the flexible element in a second rotational configuration.

Optionally, in some embodiments, the lock assembly includes: a first side wall extending from the bail; and a first tang extending from the main body. The first side wall and the first tang are adapted to interlock with one another to secure the bail in the first rotational configuration.

Optionally, in some embodiments, the lock assembly includes: a resilient portion of the bail that engages the main body to secure the bail in the first rotational configuration.

Optionally, in some embodiments, the resilient portion includes: a descending portion of the bail; a bottom portion of the bail; and an ascending portion of the bail.

Optionally, in some embodiments, the lock assembly further includes a second receptacle formed in the main body and a pawl formed in an edge portion of the bail. The pawl engages the second receptacle to secure the bail in the first rotational configuration.

DETAILED DESCRIPTION

The present disclosure is directed to adjustable fasteners, such as used for securing a cargo load to a vehicle, securing two or more objects together, etc. The adjustable fasteners disclosed herein include a flexible element such as a strap, elastic cord, bungee cord, or the like. The adjustable fasteners may include one or more securement elements such as hooks. The adjustable fasteners include a clasp assembly that receives a portion of the flexible element. The clasp assembly is configured to adjust a length of a tensioned portion of the adjustable fastener. The clasp assembly may also include one or more securement elements formed therewith or coupled thereto.

The clasp assembly includes a main body and a bail. The main body slidably receives a portion of the flexible element. The bail is rotatably coupled to the main body. In some embodiments, the main body may include one or more recesses, and the bail may include one or more protruding members configured to be received in corresponding recesses. In some embodiments, the protruding members have a resilient property that can allow the protruding embers to flex or bend to snap into the recesses. The bail includes a cam portion that selectively engages the flexible element when the bail is in a locked first rotational position and disengages the flexible element when the bail is in an unlocked second rotational position. When in the first rotational position, the cam portion engages the flexible element to prevent or reduce sliding movement of the flexible element with respect to the clasp assembly. The bail includes a lock assembly that secures the bail in the first rotational position and thus secures the cam portion to the flexible element. The lock portion can help prevent unwanted or inadvertent disengagement of the cam portion from the flexible element, thereby reducing or preventing the unwanted securement of the load.

Turning to the figures, FIG. 1A—FIG. 1F illustrate an embodiment of an adjustable fastener 100. The flexible element 110 is hidden in FIG. 1F, for clarity. The adjustable fastener 100 includes a flexible element 110. In many examples, the flexible element 110 is an elongated element such as a strap. The flexible element 110 may be formed of any suitable material that can withstand tension 188 placed thereon to secure the flexible element 110 to a load, vehicle, or other object. In many examples, the flexible element 110 includes an elastomeric material such as natural or synthetic rubber, a bungee cord, etc. In some examples, the flexible element 110 is a woven fabric strap, leather, etc.

Figure 1A:
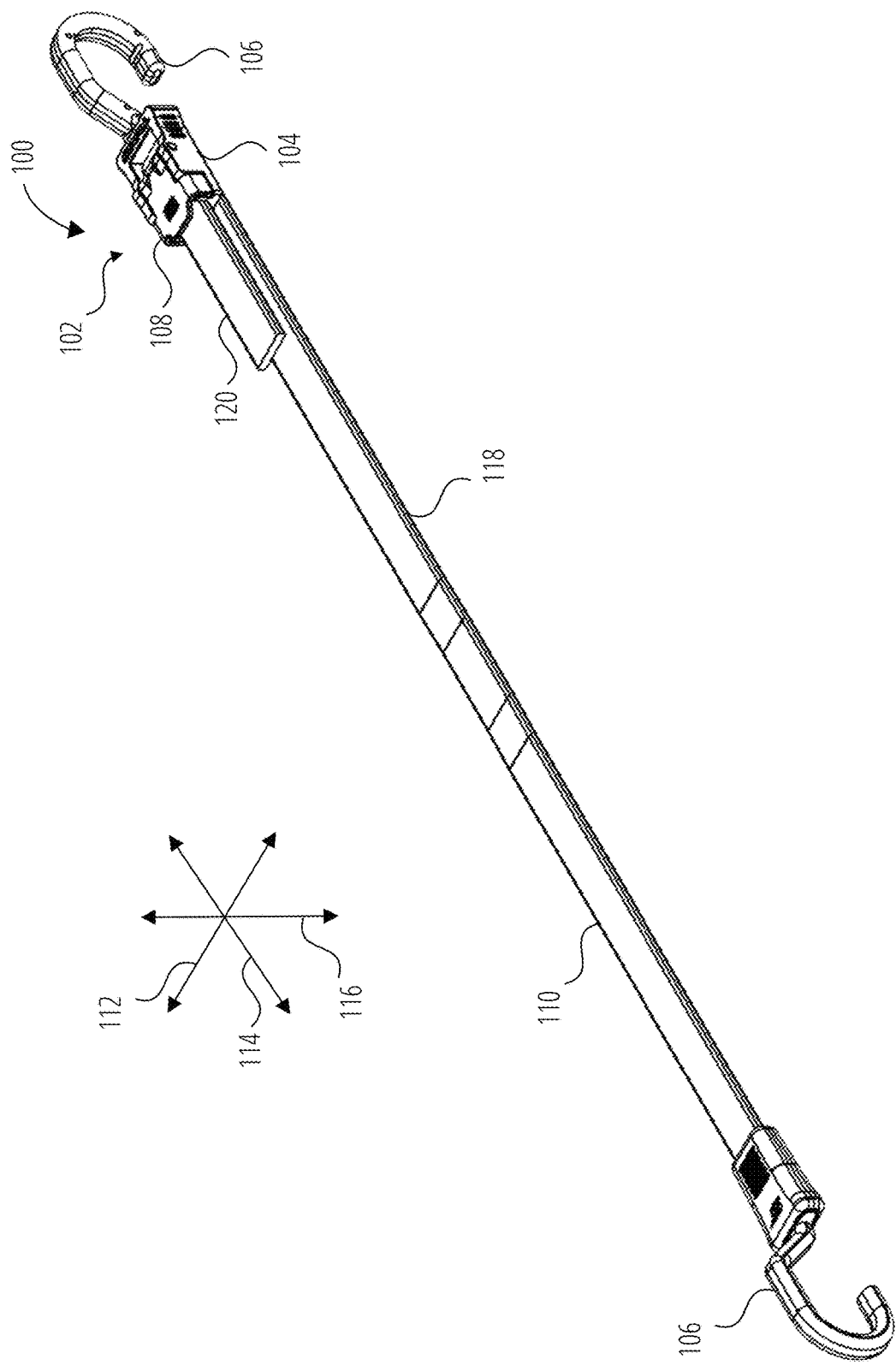
FIG. 1A is an isometric view of an embodiment of an adjustable fastener.

The flexible element 110 may include an attachment structure 106 formed with, or attached to, the flexible element 110. The flexible element 110 has a tension portion 118 and a tail portion 120. The tension portion 118 is a portion that may be tensioned when the adjustable fastener 100 is attached to a load, anchor, or other object. The tail portion 120 is typically not attached to another object but rather is a spare portion of the flexible element 110 used to adjust a length of the adjustable fastener 100. In the example of FIG. 1A, an attachment structure 106 is disposed at an end portion of the tension portion 118 of the flexible element 110. In some embodiments, the tail portion 120 may also be coupled to or formed with an attachment structure 106. The attachment structure 106 may be coupled to the flexible element 110 by any suitable method including, without limitation, adhesives, mechanical fasteners like rivets, bolts, screws, clamps, etc. In some examples, the attachment structure 106 may be over-molded or co-molded with the flexible element 110. The attachment structure 106 may be a hook, eyelet, ring, e-track connector, etc., and may be disposed at either or both ends, and/or along the length, of the flexible element 110.

The flexible element 110 includes a clasp assembly 102 that receives the flexible element 110. The clasp assembly 102 is adapted to adjust a length of the adjustable fastener 100. For example, the clasp assembly 102 may be used to adjust the relative lengths of the tension portion 118 and the tail portion 120. The clasp assembly 102 may include, or be formed with, one or more attachment structures 106, as described herein.

It may be helpful in describing the various embodiments, of adjustable fasteners herein to refer to various directions. For example, a longitudinal direction 114, a lateral direction 112, and/or a depth direction 116. These directions and the accompanying description are provided for the purposes of illustration only and are in no way meant to be limiting. The longitudinal direction 114 may be defined along a length dimension of the flexible element 110, typically the longest dimension of the flexible element 110. The lateral direction 112 may be defined along a face of the flexible element 110, such as between left and right. Typically, the dimension of the flexible element 110 along the lateral direction 112 is the second largest dimension of the flexible element 110 and typically much smaller than the length dimension. The longitudinal depth direction 116 may be defined along a depth dimension of the flexible element 110. Typically, the depth dimension is the smallest of the three dimensions of the flexible element 110.

With particular reference to FIG. 1B—FIG. 1F, features of the clasp assembly 102 are discussed in further detail. The clasp assembly 102 may have a main body 104 and a bail 108. The bail 108 may be pivotally coupled to the main body 104 at a pivot 124. Respective portions of the bail and the main body 104 may form a lock assembly 126 that releasably secures the bail 108 to the main body 104 to prevent or limit rotational movement therebetween. In many examples, the bail 108 includes a cam portion 168.

Figure 1B:
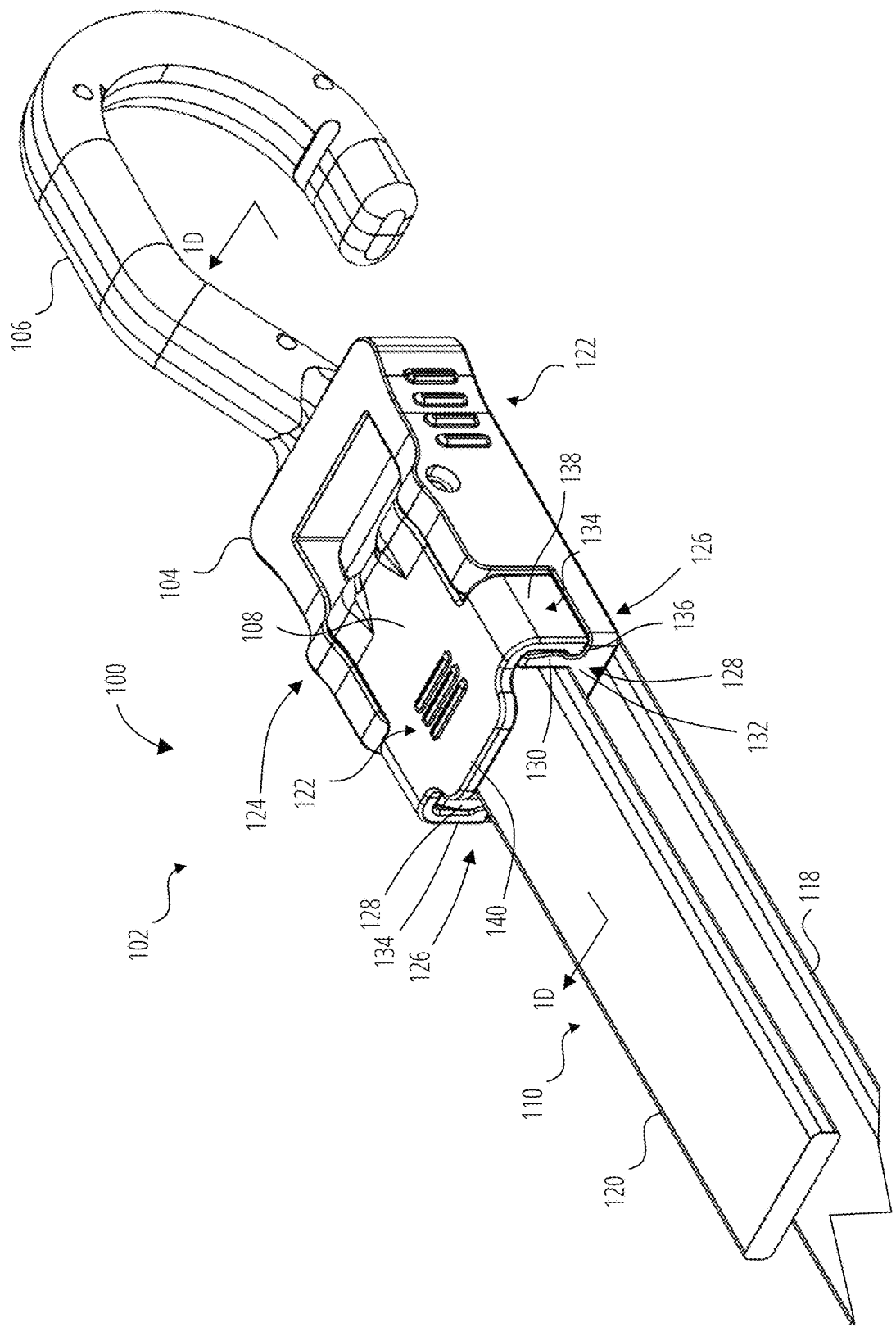
FIG. 1B is a detail isometric view of a portion of the adjustable fastener of FIG. 1A.
Figure 1C:
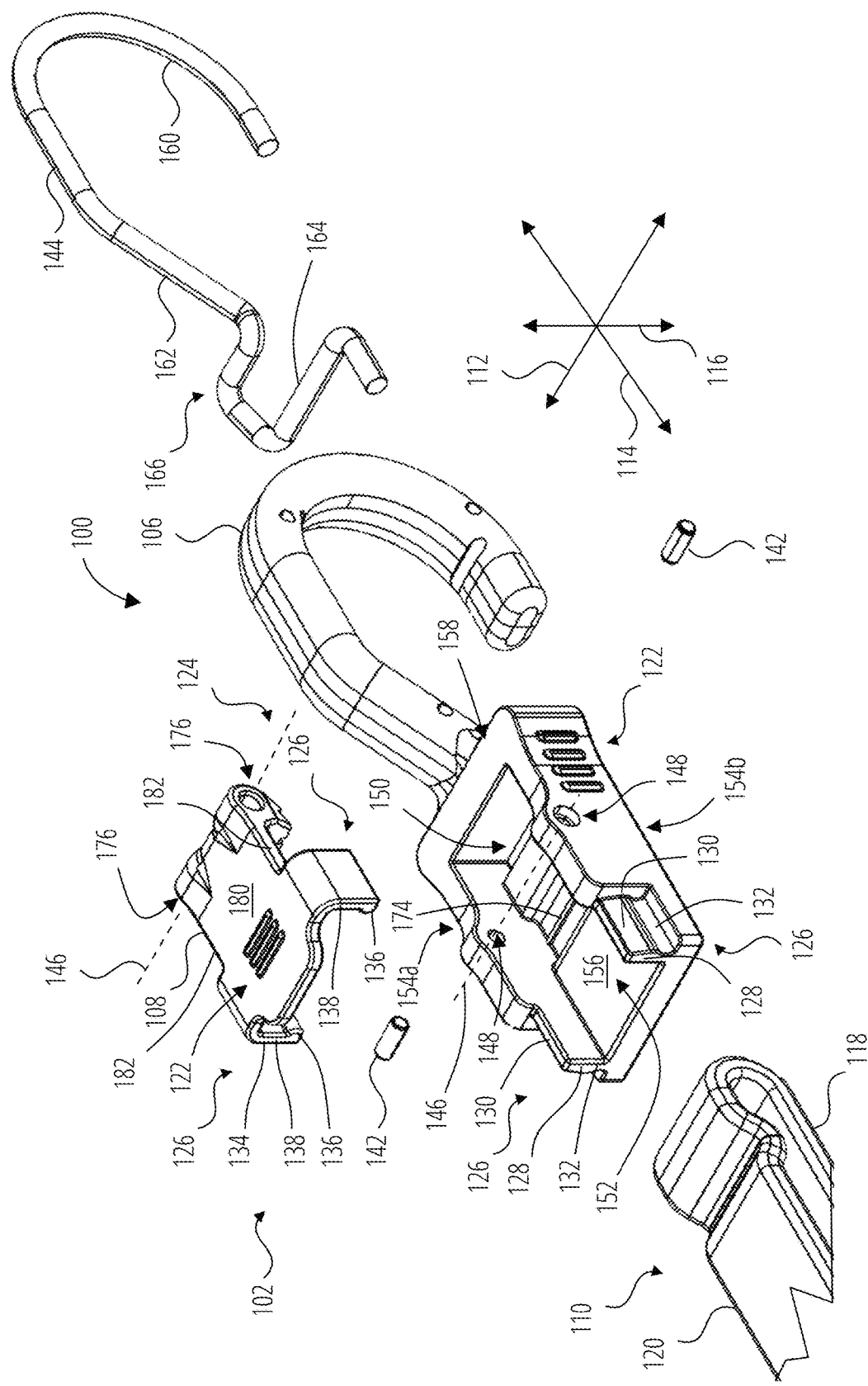
FIG. 1C is a partial exploded isometric view of a portion of the adjustable fastener of FIG. 1A.
Figure 1D:
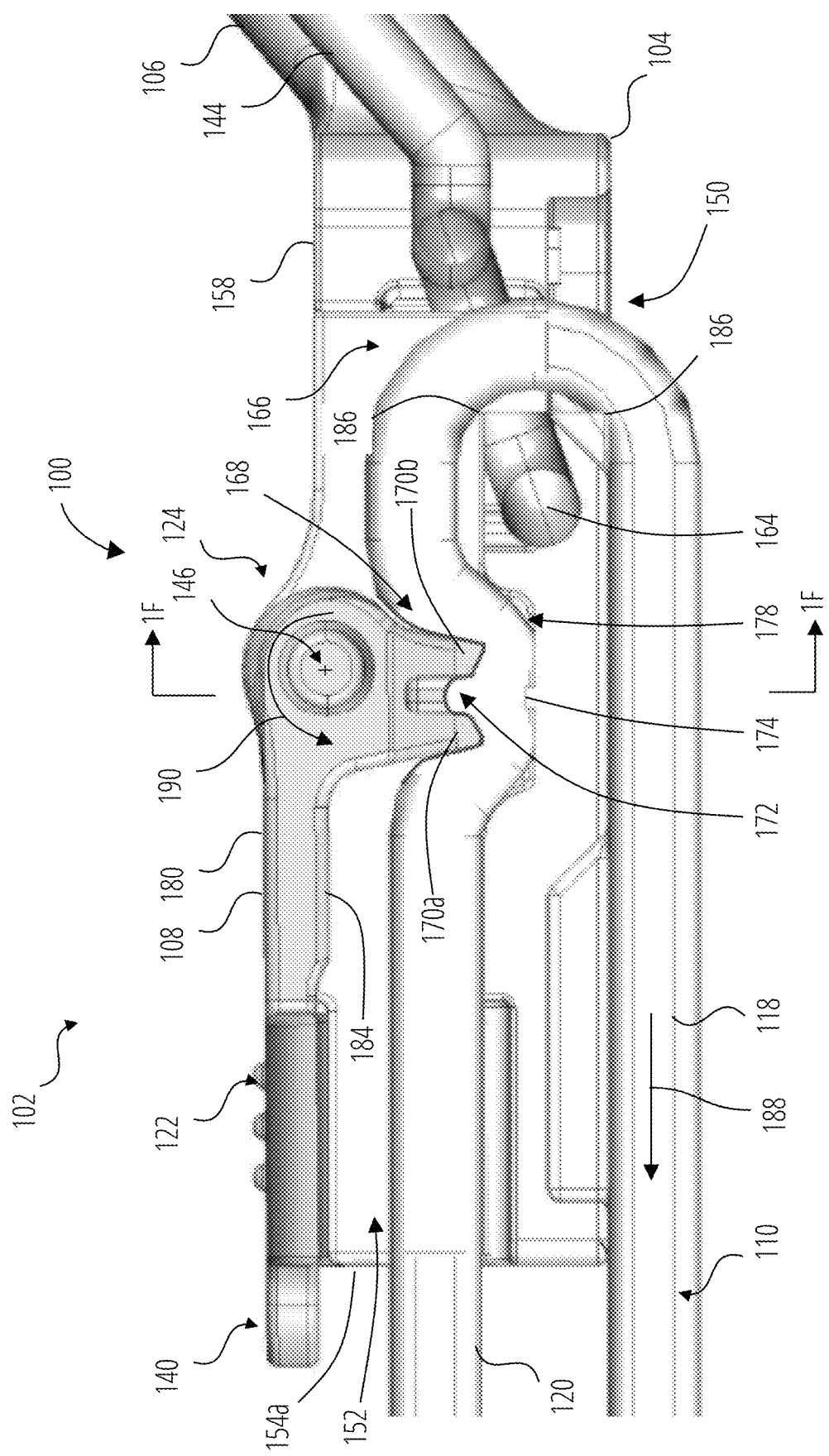
FIG. 1D is a partial section view of a portion of the adjustable fastener of FIG. 1A in a first configuration taken along line 1D-1D of FIG. 1B.
Figure 1E:
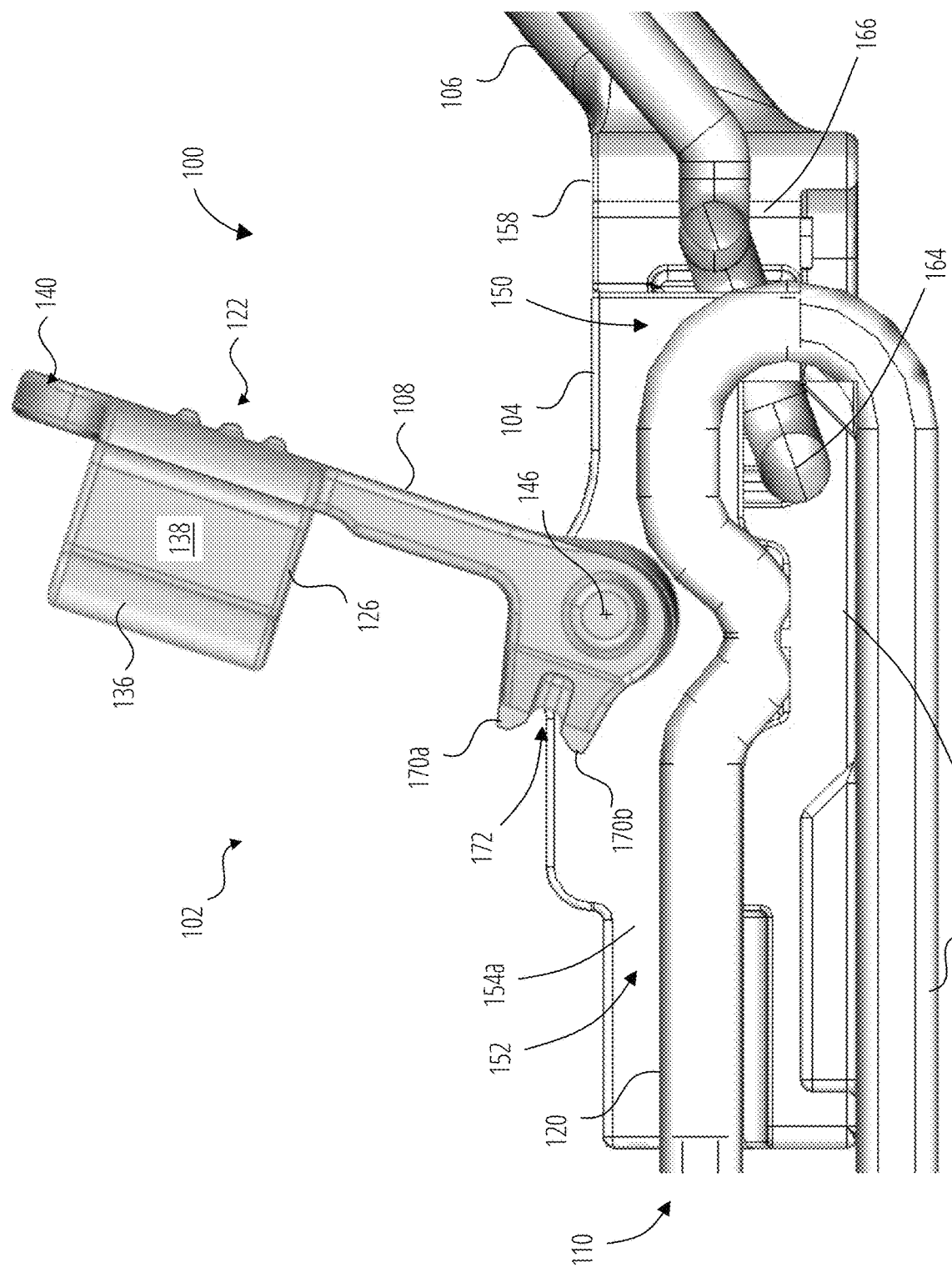
FIG. 1E is a partial section view of a portion of the adjustable fastener of FIG. 1A in a second configuration taken along line 1D-1D of FIG. 1B.

The main body 104 may have an end wall 158 extending substantially in the lateral direction 112 and the depth direction 116. One or more side walls 154*a/b* may extend in the longitudinal direction 114 from the end wall 158. A floor 156 may extend between at least a portion of the side wall 154*a/b*. For example, the floor 156 may extend between bottom portions of the side walls 154*a/b*. Thus, a compartment 152 may be formed in the main body 104 above the floor 156. As best shown in FIG. 1B, FIG. 1D, and FIG. 1E the flexible element 110 may be received in the compartment 152. The floor 156 may extend along only a portion of the side walls 154*a/b* such that a receptacle 150 may be formed in the main body 104. For example, the floor 156 may stop short of the end wall 158 leaving a gap between the side walls 154*a/b*. The receptacle 150 may be in communication with the compartment 152. A recess 178 may be formed in the floor 156, such that the recess 178 extends further in the depth direction 116 than other parts of the floor 156. An engagement feature 174 may protrude up from the bottom of the recess 178 toward the cam portion 168. In some examples, the engagement feature 174 may be a raised rib extending across the width of the recess 178, or may be a series of discrete protrusions extending in a line across the width of the recess, or may extend in an area of the bottom of the recess.

One or more apertures 148 may be formed in the side walls 154*a/b*. The apertures 148 may be substantially aligned with one another such that they form a single channel through the main body 104. For example, the apertures 148 may be aligned to form an axis 146 about which the bail is pivotally coupled to the main body.

The main body may include protruding members such as one or more tangs 128 that may extend from the main body 104. The tangs 128 may have a head portion 130 and a neck portion 132. The head portion 130 generally has a dimension in the lateral direction 112 larger than the dimension of the neck portion 132 in the lateral direction 112.

One or more of the side walls 154*a/b* may include a grip 122 formed therein or thereon. The grip 122 may include one or more raised ridges or depressions with respect to the main body 104 and may aid in handling the clasp assembly 102. In other examples, the grip 122 may be a friction enhancing surface or material (e.g., sand paper, grip tape, or the like). The grip 122 may increase friction between the main body 104 and a user's fingers.

The main body 104 may be formed of any suitable material that can withstand the stresses imparted thereon when securing an object with the adjustable fastener 100.

For example, the main body 104 may be formed of a plastic material, metal, wood, composite material, combinations of these, or the like. In many embodiments, a portion of the main body 104 may have an elastic or resilient property such that portions of the main body 104 may flex or bend without taking a permanent set (e.g., may bend elastically without plastic deformation).

An attachment structure 106 may be formed with or coupled to the main body 104, such as at the end wall 158. In other embodiments, the attachment structure 106 may be coupled to another portion of the main body 104. The attachment structure 106 may include an inner body 144. The inner body 144 may help reinforce the attachment structure 106. For example, the inner body 144 may be a wire or other structure with a higher strength and or stiffness than the material that forms the main body 104. The inner body 144 may conform to a shape of the attachment structure 106. For example, the inner body 144 may be in the shape of a hook. The inner body 144 may have a hook portion 160, a neck portion 162, a transition portion 166, and a lateral portion 164. At least a portion of the inner body 144 may be received in the end wall 158, side wall 154a/b, or floor 156 of the main body 104. For example, the transition portion 166 may be received in the end wall 158 and one of the side walls 154a/b. The lateral portion 164 may be received in the floor 156.

The bail 108 may include a top face 180 and a bottom face 184 offset therefrom in the depth direction 116. The bail 108 may extend between respective edge portions 182 in the lateral direction 112. The top face 180 may include a grip 122 as previously described. One or more side walls 134 may extend in the depth direction from the top face 180. The side walls 134 may extend at a sharp angle from the top face 180 or may be rounded, chamfered, filleted, etc. The side wall 134 may have a neck portion 138 and a head portion 136. The head portion 136 generally has a dimension in the lateral direction 112 larger than the dimension of the neck portion 138 in the lateral direction 112. The bail 108 may have one or more apertures 176 formed therein. The apertures 176 may be separate apertures. The apertures 176 may be through apertures or blind apertures. The apertures 176 may be substantially aligned to form a single channel through the bail 108. The apertures 176 may form part of the axis 146. The bail 108 may include a handle 140 to facilitate the pivotal motion of the bail 108 relative to the main body 104.

Figure 1F:
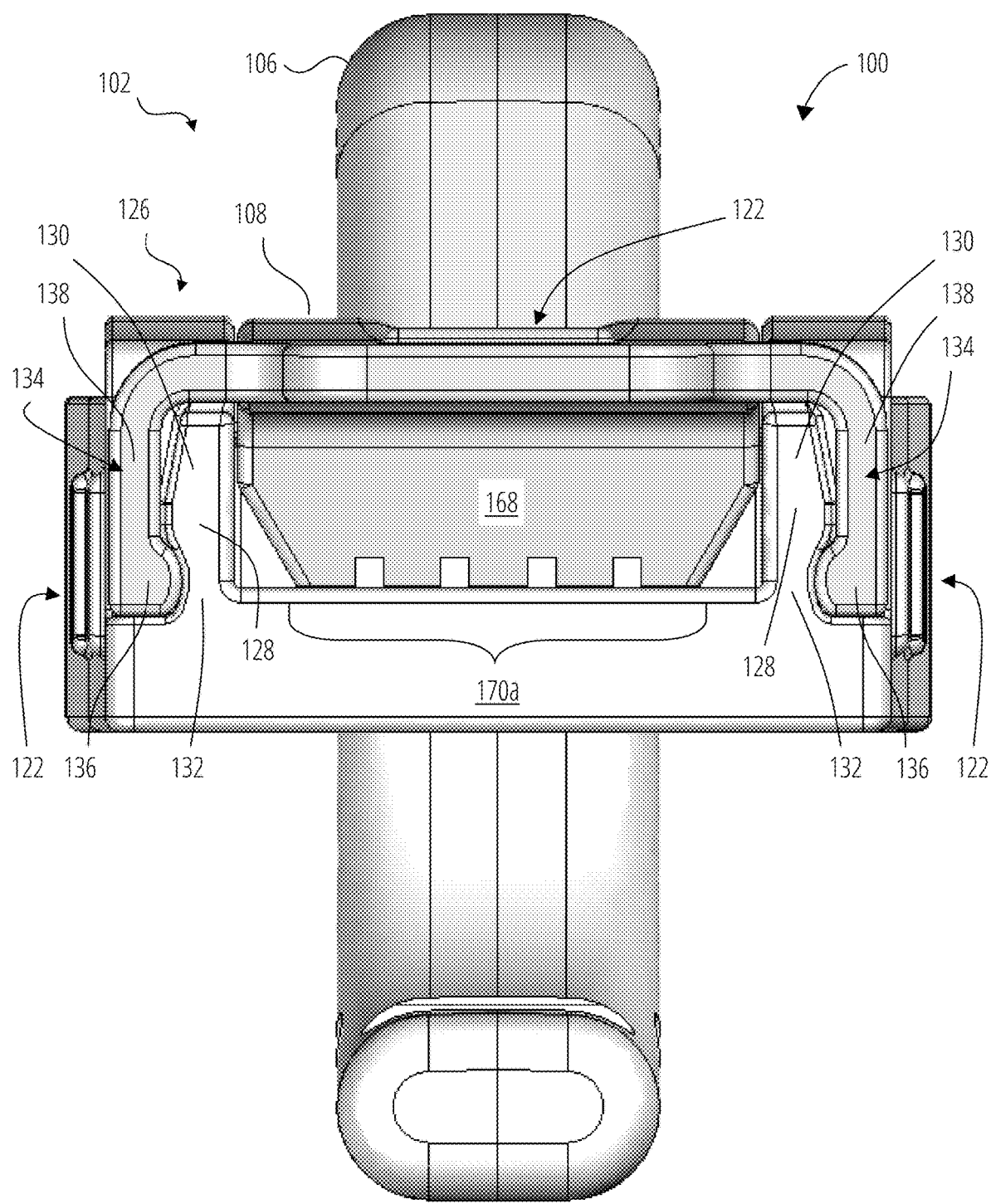
FIG. 1F is a partial section view of a portion of the adjustable fastener of FIG. 1A taken along line 1F-1F of FIG. 1D with the flexible element not shown, for clarity.

As best shown in FIG. 1E-FIG. 1F, the bail 108 may have a cam portion 168 extending from a bottom face 184 thereof. The cam portion 168 may have one or more teeth 170 formed therein or therewith. For example, the cam portion 168 may have a first plurality of teeth 170a and a second plurality of teeth 170b offset from one another in the longitudinal direction 114. The teeth 170a and teeth 170b may be separated by a channel 172 in the longitudinal direction 114.

The bail 108 may be made of the same or similar materials as the main body 104, e.g., plastics, metal, wood, composites, or combinations thereof. At least a portion of the bail 108 may have an elastic or resilient property.

To assemble the clasp assembly 102, the bail 108 may be inserted into the compartment 152 such that the apertures 176 in the bail 108 substantially align with the apertures 148 in the main body 104. In other words, the portions of the axis 146 defined by the bail 108 may be aligned with the portions of the axis 146 formed by the main body 104. One or more axles 142 may be inserted into the apertures 148 from the outer surface of the respective side walls 154a/b and into the apertures 176. On some embodiments, separate axles 142 are used, while in others, a single axle 142 is inserted to pivotally secure the bail 108 to the main body 104. In some embodiments, the axles 142 may be cylindrical spring clips that expand against the inner surfaces of the aperture 148 and/or aperture 176 to secure the axles 142 to the clasp assembly 102. In other examples, the axles 142 may be pins, screws, rivets, or the like. The axles 142 along with the apertures 148 and aperture 176 may form a pivot 124 that enables the bail 108 to pivot with respect to the main body 104. With the bail 108 in the position of FIG. 1E, the tail portion 120 of the flexible element 110 may be inserted through the receptacle 150 (e.g., from the bottom of the main body 104 and looped around the floor 156, beneath the bail 108, in the recess 178, and out the main body 104 via the compartment 152. The tail portion 120 may be pulled through the main body 104 to adjust the adjustable fastener 100 to the desired length.

As best shown in FIG. 1D and FIG. 1E, when the bail 108 is in a first rotational position shown e.g., in FIG. 1D, received at least partially in the compartment 152, the clasp assembly 102 secures the flexible element 110 to limit or prevent slippage of the flexible element 110 through the main body 104. For example, the cam portion 168 engages the flexible element 110. The cam portion 168, or other portions of the bail 108 may compress, pinch, or otherwise trap the flexible element in the recess 178 to limit or prevent slippage of the flexible element with respect to the main body 104. The teeth 170a/b may dig into the material of the flexible element 110 and may press the flexible element 110 into the recess 178. Similarly, the engagement feature 174 may dig into the material of the flexible element 110. The floor 156 may have one or more corners 186 that additionally reduce slippage of the flexible element 110. For example, the corners 186 may be sharp corners at an angle that causes the corners 186 to dig into the material of the flexible element 110 reducing or preventing slippage of the flexible element 110. In some embodiments, the corners 186 may be 90° angles, obtuse angles, or even acute angles.

As best shown in FIG. 1F, the tangs 128 and the side walls 134 may together form the lock assembly 126. When locked as shown for example in FIG. 1D in the first rotational position, the lock assembly 126 may prevent or limit the unwanted or unintentional movement of the bail 108 from the first rotational position to the second rotational position. For example, the head portion 136 of the side wall 134 engages the neck portion 132 of the tang 128, and the head portion 130 of the tang 128 engages the neck portion 138 of the side wall 134 to secure the cam portion 168 in the first rotational position. The tangs 128 and side walls 134 on opposing sides of the main body 104 and bail 108 may function similarly. As the lock assembly 126 is moved to the locked position, either or both of the tangs 128 and/or side walls 134 may flex or bend elastically or resiliently such that the respective head portions 130/136 can pass one another to engage or interlock with the respective neck portions 132/138. Thus, the lock assembly 126 may snap or click into place. The lock assembly 126 can be moved to the unlocked position by grasping the handle 140 and moving the bail to the second rotational position. Similarly to when the lock assembly 126 is locked, the side walls 134 and/or tangs 128 may elastically or resiliently bend or flex to allow the head portions 130/136 thereof to clear one another.

In the unlocked second rotational position shown for example, in FIG. 1D, the cam portion 168 disengages the flexible element 110 such that the flexible element 110 can be freely moved through the main body 104, such as to adjust the length of the adjustable fastener 100. For example, the tail portion 120 may be lengthened and the tension portion 118 shortened, lowering the overall length of the adjustable fastener 100. Alternately, the tension portion 118 may be lengthened and the tail portion 120 shortened, increasing the overall length of the adjustable fastener 100. In some examples of use the attachment structures 106 at opposing end portions of the adjustable fastener 100 may be secured to one or more anchors and the tail portion 120 may be tensioned, thereby tightening the flexible element 110 between the anchors and inducing tension in the tension portion 118. While the tail portion 120 is tensioned, the bail 108 may be moved to the first rotational position (e.g., FIG. 1F) and the flexible element 110 secured to the main body 104. The inner body 144 may add structural rigidity and/or strength to the clasp assembly 102 to help resist such tension. For example, the lateral portion 164 in the floor 156 may transmit stress through the transition portion 166 to the hook portion 160 to reduce or prevent warpage, bending, cracking, etc. of the main body 104 under tension and thus prevent a load from becoming unsecured.

Figure 2A:
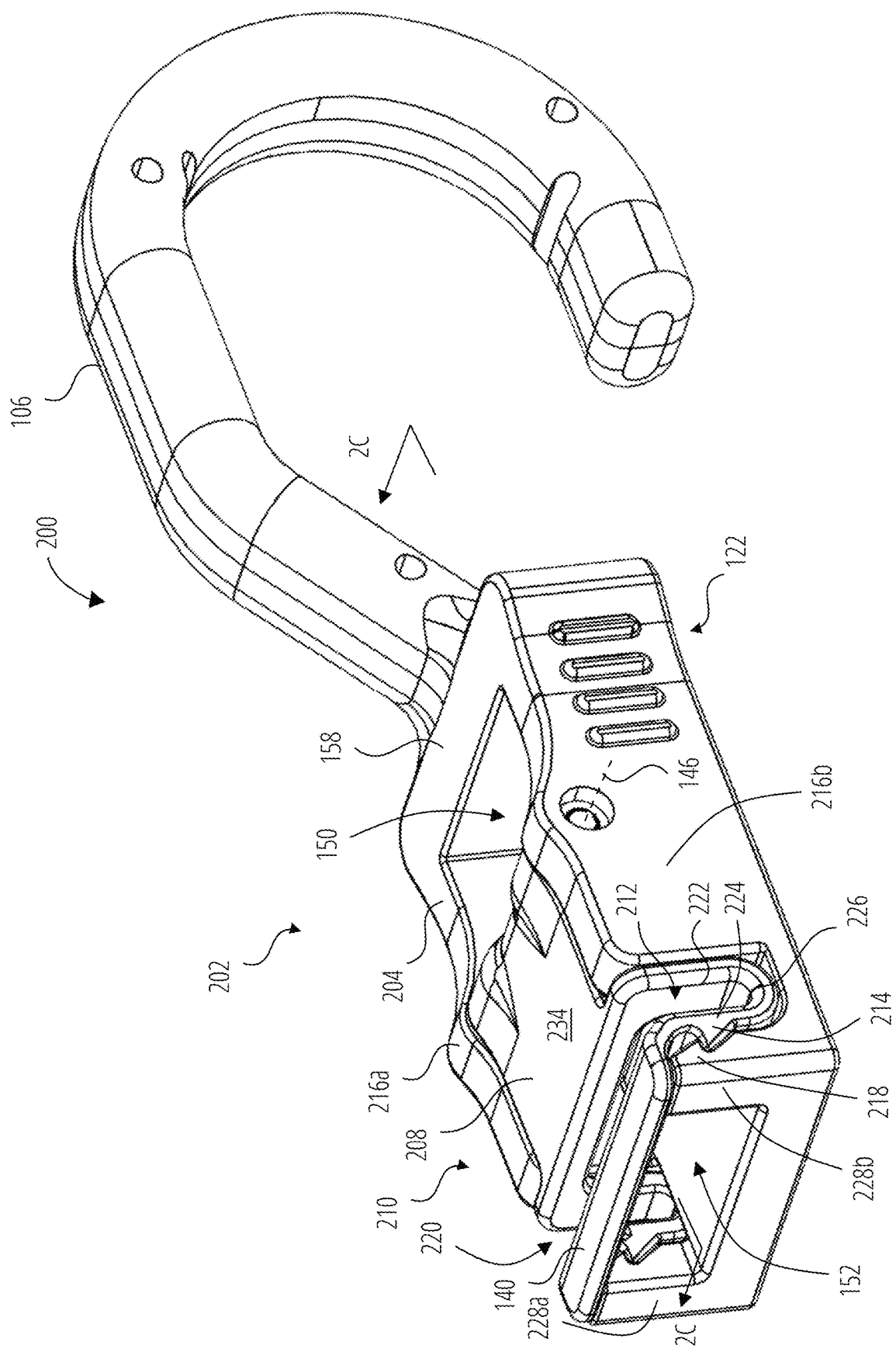
FIG. 2A is a detail isometric view of a portion an embodiment of an adjustable fastener with the flexible element not shown, for clarity.
Figure 2B:
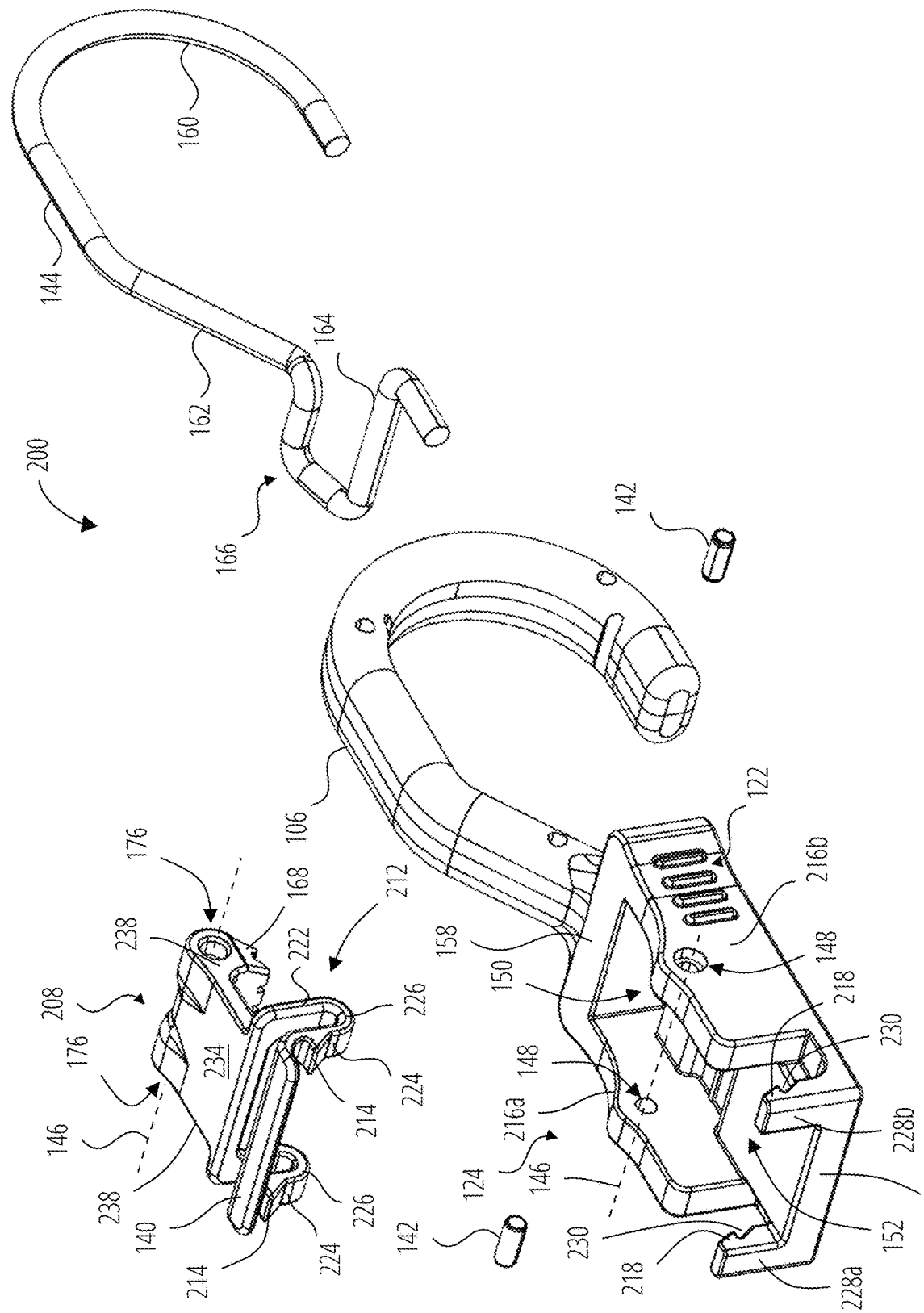
FIG. 2B is a partial exploded isometric view of a portion of the adjustable fastener of FIG. 2A with the flexible element not shown, for clarity.
Figure 2C:
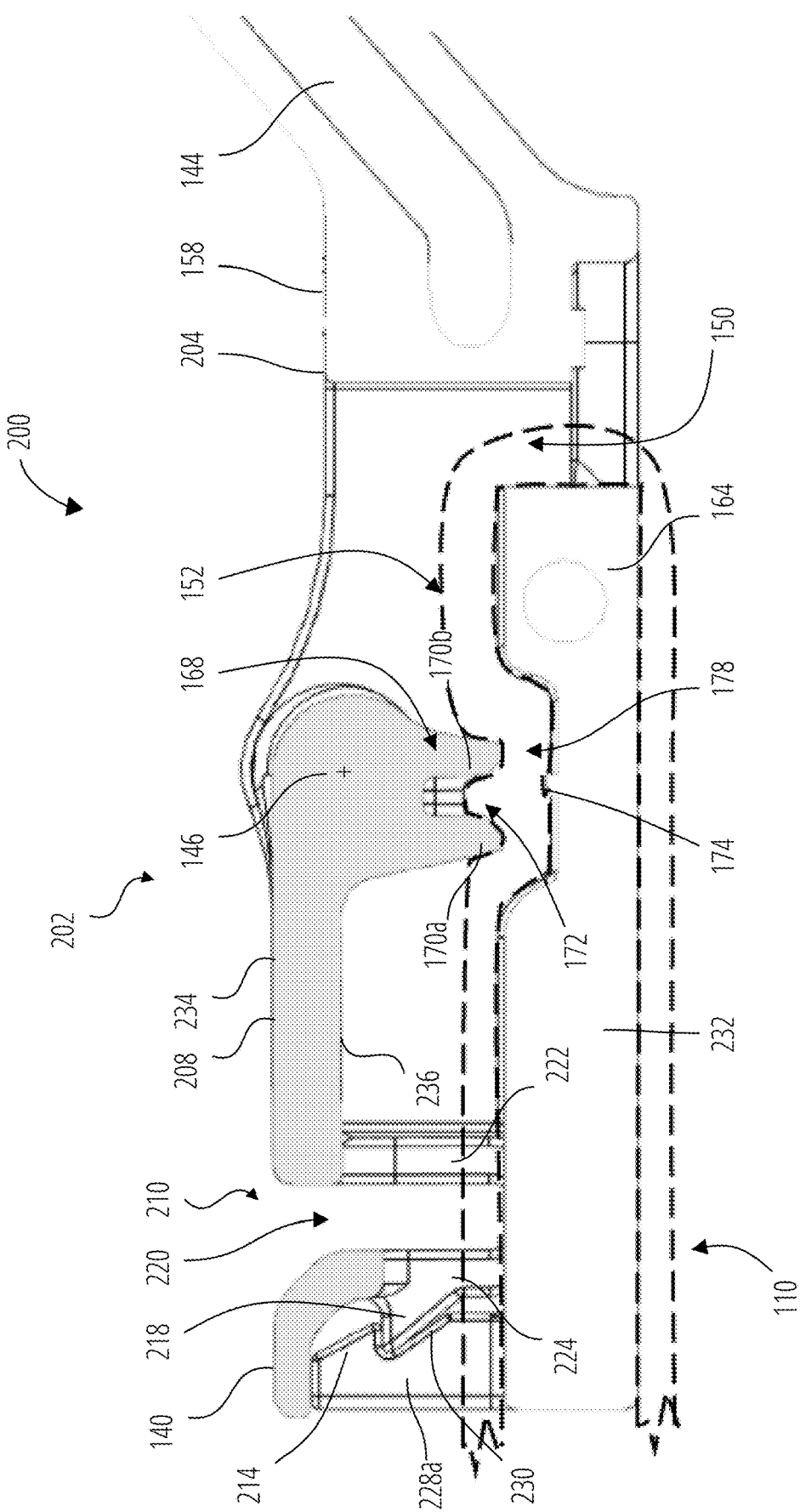
FIG. 2C is a partial section view of a portion of the adjustable fastener of FIG. 2A in a first configuration taken along line 2C-2C of FIG. 2A.

With reference to FIG. 2A—FIG. 2C, an embodiment of an adjustable fastener 200 is disclosed. The adjustable fastener 200 is similar to the adjustable fastener 100 in many aspects such as the use of a flexible element 110, one or more attachment structures 106, a clasp assembly 202 with a main body 204 and a bail 208. The portions of the main body 204 that interact with the flexible element 110, such as the attachment structure 106 and the inner body 144 are substantially similar to the corresponding portions of the clasp assembly 102. Similarly, the features of the bail 208 that engage with the flexible element 110 are similar to those of the bail 108. The cam portion 168, or other portions of the bail 208 may compress, pinch, or otherwise trap the flexible element in the recess 178 to limit or prevent slippage of the flexible element with respect to the main body 204. For example, the cam portion 168 and the teeth 170a/b of the bail 208 are substantially similar to those features of the bail 108. The features of the clasp assembly 202 that are similar to those of the clasp assembly 102 are numbered to correspond to those of the clasp assembly 102 and are not described further herein, for the sake of brevity. The clasp assembly 202 differs from the clasp assembly 102 in the lock assembly 210 and the related portions of the main body 204 and bail 208.

The main body 204 includes one or more side walls 216a/b that extend in the longitudinal direction 114 from the end wall 158. A floor 232 may extend between at least a portion of the side walls 216a/b. For example, the floor 232 may extend between bottom portions of the side walls 216a/b. Thus, a compartment 152 may be formed in the main body 204 above the floor 232. As with the clasp assembly 102, the flexible element 110 may be received in the compartment 152. The floor 232 may extend along only a portion of the side walls 216a/b such that a receptacle 150 may be formed in the main body 204. For example, the floor 232 may stop short of the end wall 158 leaving a gap between the side walls 216a/b. The receptacle 150 may be in communication with the compartment 152. A recess 178 may be formed in the floor 232, such that the recess 178 extends further in the depth direction 116 than other parts of the floor 232. An engagement feature 174 may protrude up from the bottom of the recess 178 toward the cam portion 168.

A receptacle 220 may be formed in one or more of the side walls 216a/b. For example, the receptacle 220 may form a slot that extends through the one or more side walls 216a/b. The receptacle 220 may form one or more pedestals 228a/b at an end portion of the main body 204 opposite from the end wall 158. The pedestals 228a/b may have a pawl 218 and a recess 230 formed therein. The recess 230 may have a dimension in the longitudinal direction 114 that is smaller than a dimension of the pawl 218 in the longitudinal direction 114. The pedestals 228a/b may be spaced apart from one another by the floor 232.

The bail 208 may include a top face 234 and a bottom face 236 offset therefrom in the depth direction 116. The bail 208 may extend between respective edge portions 238 in the lateral direction 112. The top face 234 may include a grip 122 as previously described. The bail 208 may include one or more resilient portions 212 of the bail 208 that engage the main body 204 to secure the cam portion 168 in the first rotational configuration (shown e.g., in FIG. 2C). The resilient portion 212 may include a descending portion 222 of the bail 208, a bottom portion 226 of the bail 208, and an ascending portion 224 of the bail 208. The resilient portion 212 may have a substantially U-shape. The ascending portion 224 may include a protruding member such as a pawl 214 formed thereon or therewith. The pawl 214 may have a dimension in the longitudinal direction 114 that is larger than a dimension of the ascending portion 224 in the longitudinal direction 114. The resilient portions 212 may be connected to one another by a handle 140 that extends therebetween.

The clasp assembly 202 may be assembled similarly to the clasp assembly 102. As best shown in FIG. 2C, the pawl 214 and the pawl 218 may together form the lock assembly 210. When locked as shown for example in FIG. 2C, the lock assembly 210 may prevent or limit the unwanted or unintentional movement of the bail 208 from the first rotational position to the second rotational position. For example, the pawl 218 of the resilient portion 212 may engage the recess 230 of the pedestals 228a/b. The pawl 218 and the pawl 214 may interlock with one another to secure the bail 208 in the first rotational position. The pawl 218 and pawl 214 on opposing sides of the main body 104 and bail 108 may function similarly. As the lock assembly 210 is moved to the locked position, the pedestal 228a/b and/or the resilient portion 212 may flex or bend elastically or resiliently such that the respective pawl 214 and pawl 218 can pass one another to engage one another. Thus, the lock assembly 210 may snap or click into place. The lock assembly 210 can be moved to the unlocked position by grasping the handle 140 and moving the bail 208 to the second rotational position. The handle 140 may be used to elastically or resiliently bend or flex the resilient portion 212 such that the pawl 218 disengages from the pawl 214.

With reference to FIG. 3A—FIG. 3D, an embodiment of an adjustable fastener 300 is disclosed. The adjustable fastener 300 is similar to the adjustable fastener 100 and the adjustable fastener 200 in many aspects such as the use of a flexible element 110, one or more attachment structures 106, a clasp assembly 302 with a main body 304 and a bail 308. The portions of the main body 304 that interact with the flexible element 110 may be substantially similar to the corresponding portions of the clasp assembly 102 and/or clasp assembly 202. Similarly, the features of the bail 308 that engage with the flexible element 110 may be similar to those of the bail 108 and the bail 208. The cam portion 168, or other portions of the bail 108 may compress, pinch, or otherwise trap the flexible element in the recess 178 to limit or prevent slippage of the flexible element with respect to the main body 304. For example, the cam portion 168 and the teeth 170a/b of the bail 308 are substantially similar to those features of the bail 108 and/or bail 208. The features of the clasp assembly 302 that are similar to those of the clasp assembly 102 are numbered to correspond to those of the clasp assembly 102 and are not described further herein, for the sake of brevity. The clasp assembly 302 differs from the clasp assembly 102 in the lock assembly 310 and the related portions of the main body 304 and bail 308, in how the bail 308 rotationally couples to the main body 104, and in the absence of an inner body 144. However, in some embodiments the clasp assembly 302 may include an inner body 144. The materials of the main body 304 and the bail 308 may be similar to, or the same materials as, the main body 104, main body 204, bail 108, and/or bail 208. For example, the main body 304 and the bail 308 may have an elastic or resilient property.

The main body 304 includes one or more side walls 312a/b that extend in the longitudinal direction 114 from the end wall 158. A floor 318 may extend between at least a portion of the side walls 312a/b. For example, the floor 318 may extend between bottom portions of the side walls 312a/b. Thus, a compartment 152 may be formed in the main body 304 above the floor 318. As with the clasp assembly 102 and the clasp assembly 202, the flexible element 110 may be received in the compartment 152. The floor 318 may extend along only a portion of the side walls 216a/b such that a receptacle 150 may be formed in the main body 304. For example, the floor 318 may stop short of the end wall 158 leaving a gap between the side walls 312a/b. The receptacle 150 may be in communication with the compartment 152. A recess 178 may be formed in the floor 318, such that the recess 178 extends further in the depth direction 116 than other parts of the floor 318. An engagement feature 174 may protrude up from the bottom of the recess 178 toward the cam portion 168. In some examples, the engagement feature 174 may be omitted. A receptacle 314 may be formed in one or more of the side walls 312a/b. For example, the receptacle 314 may form a slot that extends through the one or more side walls 312a/b.

One or more protrusions 316 may extend from the respective side walls 312a/b into the compartment 152. The protrusion 316 may be integrally formed with the main body 304 or may be separate pieces coupled to the main body 304. The protrusions 316 may have respective tapered faces 336. The protrusions 316 may be used instead of the axles 142 as in the adjustable fastener 100 and the adjustable fastener 200. The protrusions 316 may form a portion of the pivot 124. In some examples, protrusions 316 may be use with the adjustable fasteners 100/200. For example, the protrusions 316 may be received in the respective apertures 176 formed in the bail 308. Thus, the protrusions 316 may define the axis 146 about which the bail 308 pivots with respect to the main body 304. It is appreciated that the pivot 124 used on the adjustable fastener 100 and the adjustable fastener 200 may also be used in the adjustable fastener 300 instead of the protrusions 316. The receptacle 314 formed in the main body 304 may make the side walls 312a/b more flexible or compliant in the area proximate to the protrusions 316 to aid in assembly of the clasp assembly 302. For example, when assembling the bail 308 to the main body 304, the side walls 312a/b may elastically or resiliently flex outwardly such that the tapered faces 336 of the protrusions 316 facilitate the insertion of the protrusions 316 into the apertures 176 until the protrusions 316 snap into the apertures 176. Thus, the protrusions 316 and the apertures 176 may form the pivot 124.

The side walls 312a/b and/or the floor 318 may have receptacles 328 formed therein. The receptacles 328 may extend into the side walls 312a/b and/or the floor 318 to form an L-shape in cross section (see, e.g., FIG. 3D).

Figure 3A:
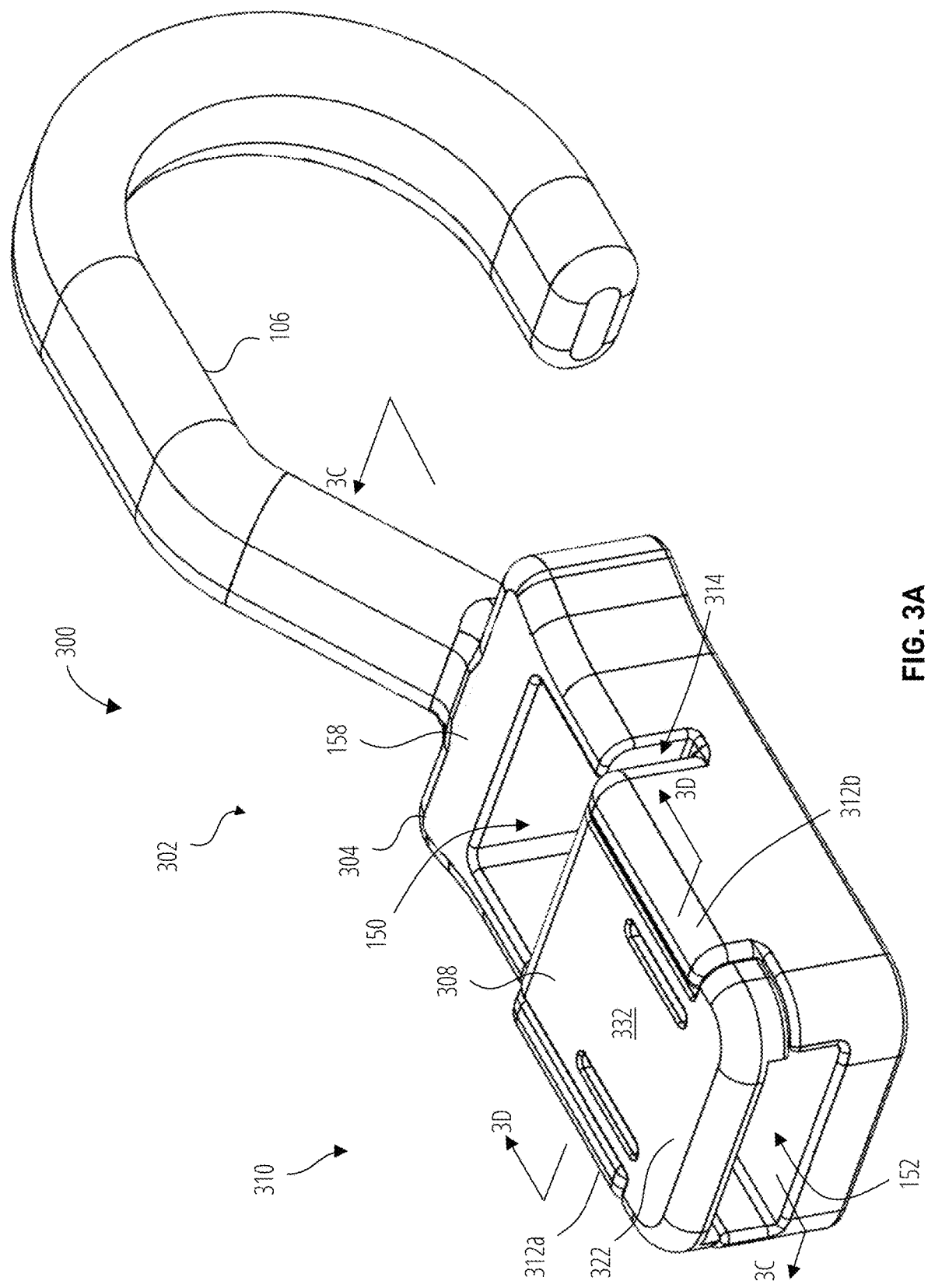
FIG. 3A is a detail isometric view of a portion an embodiment of an adjustable fastener with the flexible element not shown, for clarity.
Figure 3B:
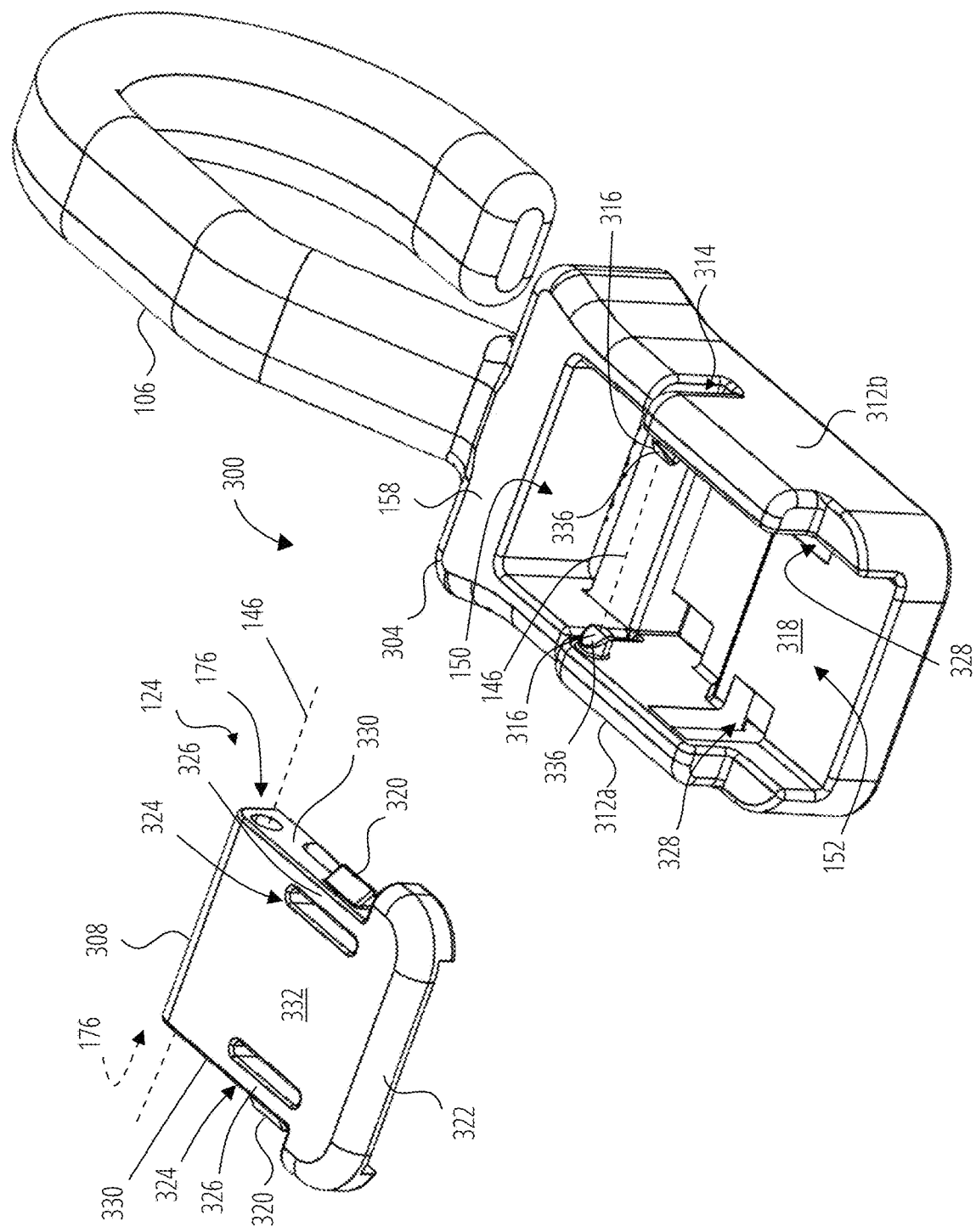
FIG. 3B is a partial exploded isometric view of a portion of the adjustable fastener of FIG. 3B with the flexible element not shown, for clarity.
Figure 3C:
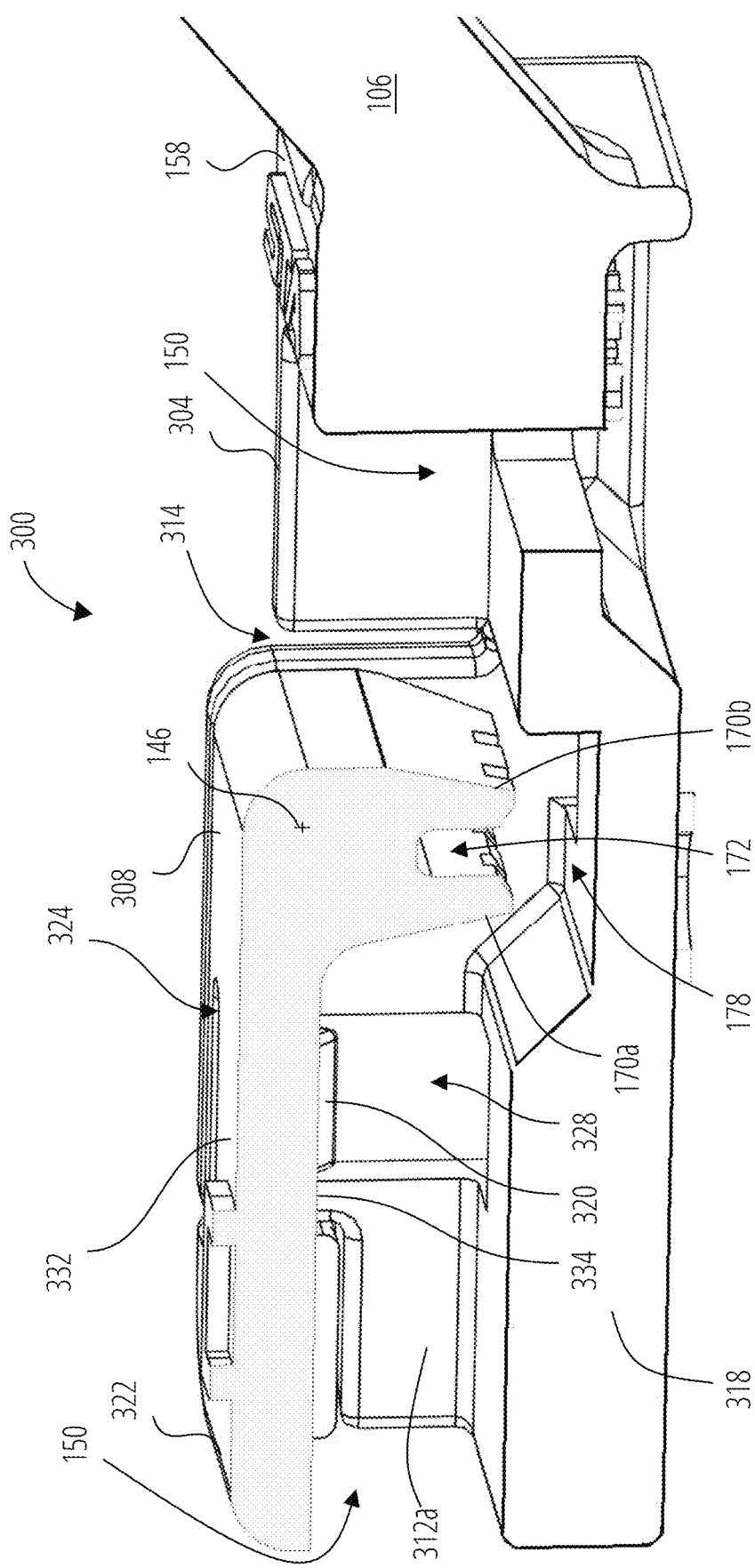
FIG. 3C is a partial section view of a portion of the adjustable fastener of FIG. 3A in a first configuration taken along line 3C-3C of FIG. 3A with the flexible element not shown, for clarity.
Figure 3D:
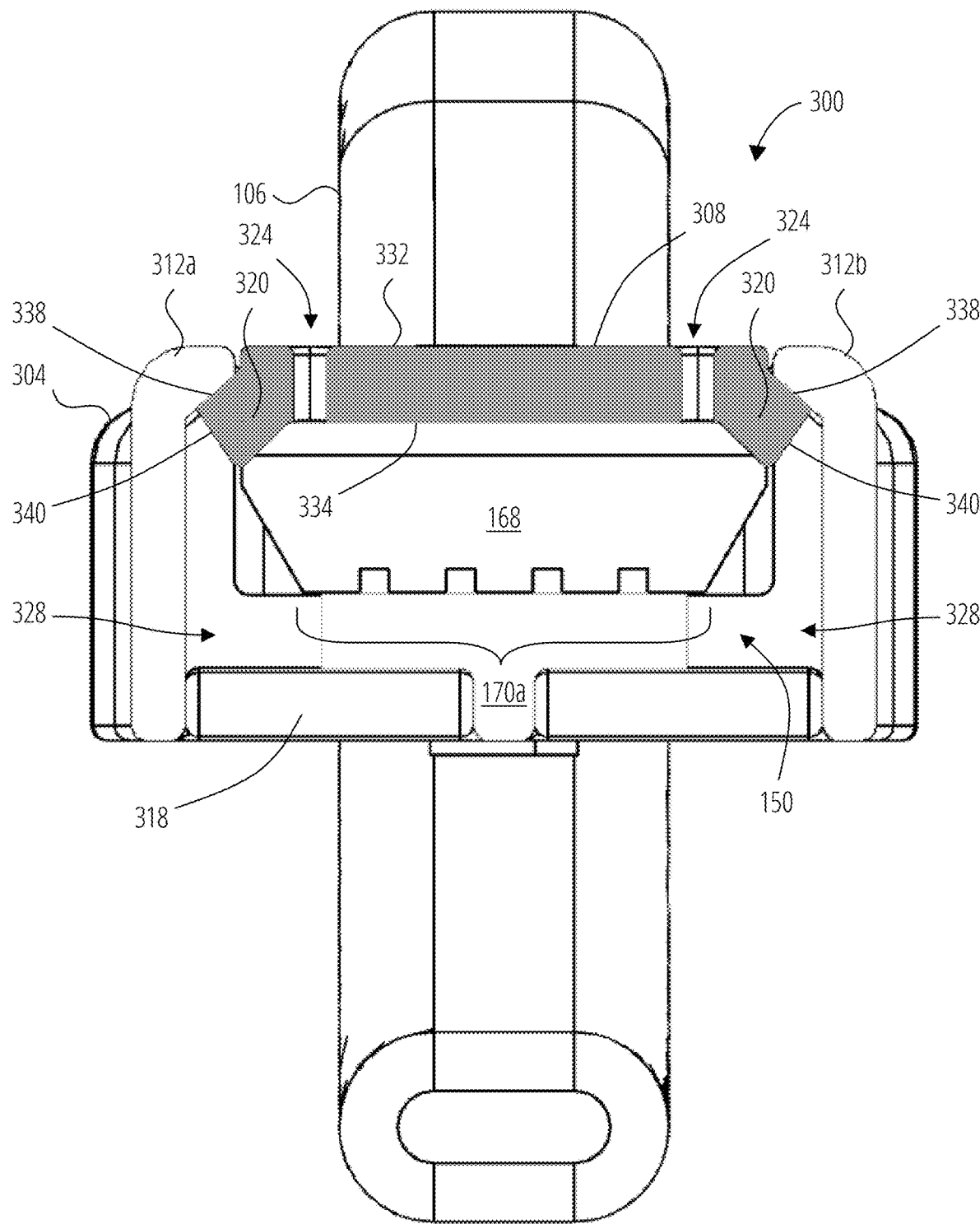
FIG. 3D is a partial section view of a portion of the adjustable fastener of FIG. 3A in a first configuration taken along line 3D-3D of FIG. 3A with the flexible element not shown, for clarity.

The bail 308 may include a top face 332 and a bottom face 334 offset therefrom in the depth direction 116. The bail 308 may extend between respective edge portions 330 in the lateral direction 112. The top face 332 may include a grip 122 as previously described. One or more pawls 320 may extend in the lateral direction 112 from the edge portions 330. The pawls 320 may be disposed on opposite edge portions 330 and/or extend in opposite directions along the lateral direction 112. As best shown in FIG. 3D, the pawls 320 may have a protruding member such as an upper tapered face 338 and a lower tapered face 340. The bail 308 may have one or more clearance apertures 324 formed therein proximate to the pawls 320. The clearance apertures 324 may be in the form of elongated slots. The clearance apertures 324 may be near the edge portions 330 such that a resilient portion 326 is formed between the clearance apertures 324 and the pawls 320.

To assemble the adjustable fastener 300, the flexible element 110 may be threaded through the receptacle 150 and compartment 152 as described for other embodiments herein. The bail 308 may be assembled with the main body 304 as discussed above. Typically, the bail 308 will be assembled with the bail 308 in the second rotational position, disengaged from the flexible element 110. Alternately, the bail 308 may be assembled with the main body 304 and the flexible element 110 may be threaded through the receptacle 150 and compartment 152 afterward.

When the bail 308 is moved from the unlocked second rotational position to the locked first rotational position, the lower tapered faces 340 of the pawls 320 may engage the upper edges of the side wall 312a/b. The tapering of the lower tapered faces 340 may help flex or spread the side walls 312a/b to allow the bail 308 to be received in the receptacle 150 and the lower tapered faces 340 be received in the receptacles 328. When the interface of the side wall 312a/b and the bail 308 passes the intersection of the lower tapered face 340 and the upper tapered face 338, the bail 308 may snap into the receptacle 150. With the bail 308 in the locked first rotational position, the upper lower tapered faces 340 may tend to keep the bail 308 locked due to the force exerted by the side walls 312a/b on the upper tapered faces 338, reducing or preventing unwanted movement of the bail 308 from the locked first rotational position and thus disengagement of the flexible element 110. However, when sufficient force is applied to the bail 308, such as at the handle 322, the upper tapered faces 338 may press on the side walls 312a/b to allow the side walls 312a/b to flex and for the bail 308 to be moved to the unlocked second rotational position, freeing the flexible element 110 to slide relative to the main body 304.

The adjustable fasteners disclosed herein have many advantages over known fasteners. For example, the clasp assemblies separate the function of securing the flexible element 110 (via the cam portion 168) and locking the bail into separate structures (e.g., the lock assembly). Thus, a force imparted to one part of the clasp assembly is less likely to affect another part of the clasp assembly to reduce the likelihood of failure. Additionally, the tension 188 in the tension portion 118 of the flexible element 110 tends, when the cam portion 168 is engaged with the flexible element 110 to pull the bail 108 toward the first rotational position. For example, the tension 188 in the tension portion 118 induces a moment 190 on the bail 108 about the axis 146 that tends to pull the bail to the locked position. Thus, increased tension 188 in the tension portion 118 tends to make the flexible element 110 even less likely to become loose, compared to known strap fasteners. Furthermore, the adjustable fasteners of the present disclosure may be easily secured to a load by attaching the attachment elements 106 to an anchor, pulling on the tail end of the flexible element, and snapping the bale into place in the locked first rotational position.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

The invention claimed is:

1. A clasp assembly comprising:
a main body with a receptacle formed therein and adapted to receive a flexible element;
a bail rotatably coupled to the main body, the bail including:
   a cam portion configured to engage the flexible element in a first rotational configuration,
   a lock assembly configured to releasably engage the main body to secure the cam portion in the first rotational configuration; and
wherein:
   the bail defines a recess;
   the main body defines a protruding member, wherein in the first rotational configuration the protruding member is received in the recess and configured to lock an elongated flexible element to the clasp;
   in a second configuration of the bail the protruding member is disengaged from the recess and is configured to release an elongated flexible member;
   the recess is formed in a first side wall extending from the bail; and
   the protruding member comprises a first tang extending from the main body, wherein the first side wall and the first tang are adapted to interlock with one another to secure the cam portion in the first rotational configuration.

2. The clasp assembly of claim 1, wherein:
the first side wall comprises:
   a side wall head portion, and
   a side wall neck portion, wherein the side wall neck portion has a dimension smaller than a dimension of the side wall head portion;
the first tang comprises:
   a tang head portion, and
   a tang neck portion, wherein:
      the tang neck portion has a dimension smaller than a dimension of the tang head portion, and
      the side wall head portion engages the tang neck portion, and the tang head portion engages the side wall neck portion to secure the cam portion in the first rotational configuration.

3. A clasp assembly comprising:
a main body with a receptacle formed therein and adapted to receive a flexible element;
a bail rotatably coupled to the main body, the bail including:
   a cam portion configured to engage the flexible element in a first rotational configuration,
   a lock assembly configured to releasably engage the main body to secure the cam portion in the first rotational configuration;
a second receptacle formed in the main body;
a pawl formed in an edge portion of the bail; and wherein:
the bail defines a recess,
the main body defines a protruding member, wherein in the first rotational configuration the protruding member is received in the recess and configured to lock an elongated flexible element to the clasp,
in a second configuration of the bail the protruding member is disengaged from the recess and is configured to release an elongated flexible member,
the pawl engages the second receptacle to secure the cam portion in the first rotational configuration,
the bail includes a clearance aperture formed between a top face of the bail and a bottom face of the bail and proximate to the pawl.

4. The clasp assembly of claim 3, wherein as the bail is moved between the first rotational configuration where the cam portion engages the flexible element and a second rotational configuration where the cam portion disengages the flexible element, the pawl at least partially displaces toward the clearance aperture to enable movement of the bail between the first rotational configuration and the second rotational configuration.

5. An adjustable fastener comprising:
an elongated flexible element including a tension portion and a tail portion;
a first attachment structure coupled to the tension portion;
a clasp assembly including:
a main body with a receptacle formed in therein and adapted to receive the tension portion;
a second attachment structure coupled to the main body; and
a bail rotatably coupled to the main body, the bail including:
a cam portion configured to engage the flexible element in a first rotational configuration, and configured to disengage the flexible element in a second rotational configuration.

6. The clasp assembly of claim 5, wherein the cam portion comprises a plurality of teeth configured to engage the flexible element in the first rotational configuration.

7. The adjustable fastener of claim 5, further comprising a lock assembly configured to releasably engage the main body to secure the cam portion in the first rotational configuration.

8. The adjustable fastener of claim 7, wherein the lock assembly comprises:
a first side wall extending from the bail; and
a first tang extending from the main body, wherein the first side wall and the first tang are adapted to interlock with one another to secure the cam portion in the first rotational configuration.

9. The adjustable fastener of claim 7, wherein the lock assembly comprises:
a resilient portion of the bail that engages the main body to secure the cam portion in the first rotational configuration, wherein the resilient portion comprises:
a descending portion of the bail;
a bottom portion of the bail; and
an ascending portion of the bail.

10. The clasp assembly of claim 7, wherein the lock assembly further comprises:
a second receptacle formed in the main body; and
a pawl formed in an edge portion of the bail, wherein the pawl engages the second receptacle to secure the cam portion in the first rotational configuration.

11. An adjustable fastener comprising:
an elongated flexible element including a tension portion and a tail portion;
a first attachment structure coupled to the tension portion; and
a clasp assembly including:
a main body with a receptacle formed in therein and adapted to receive the tension portion;
a second attachment structure coupled to the main body; and
a bail rotatably coupled to the main body, the bail including:
a lock assembly configured to releasably engage the main body to secure the bail in a first rotational configuration.

12. The adjustable fastener of claim 11, wherein the lock assembly comprises:
a first side wall extending from the bail; and
a first tang extending from the main body, wherein the first side wall and the first tang are adapted to interlock with one another to secure the bail in the first rotational configuration.

13. The adjustable fastener of claim 11, wherein the lock assembly comprises:
a resilient portion of the bail that engages the main body to secure the bail in the first rotational configuration, wherein the resilient portion comprises:
a descending portion of the bail;
a bottom portion of the bail; and
an ascending portion of the bail.

14. The clasp assembly of claim 11, wherein the lock assembly further comprises:
a second receptacle formed in the main body:
a pawl formed in an edge portion of the bail, wherein the pawl engages the second receptacle to secure the bail in the first rotational configuration.

* * * * *